United States Patent [19]

McDonald et al.

[11] 4,387,010
[45] Jun. 7, 1983

[54] METHOD OF SEPARATING $^{15}$N FROM NATURAL ABUNDANCE NO

[75] Inventors: Jimmie R. McDonald, Upper Marlboro, Md.; Andrew P. Baronavski, Alexandria, Va.

[73] Assignee: The United States of America as represented by the Secretary of the Navy, Washington, D.C.

[21] Appl. No.: 154,348

[22] Filed: May 29, 1980

[51] Int. Cl.$^3$ ............................................. B01D 59/00
[52] U.S. Cl. ............................................. 204/157.1 R
[58] Field of Search .................. 423/235; 204/157.1 R

[56] References Cited

U.S. PATENT DOCUMENTS

| | | | |
|---|---|---|---|
| 4,064,025 | 12/1977 | Chen | 204/158 R |
| 4,076,606 | 2/1978 | Suzuki et al. | 204/157.1 R |
| 4,110,182 | 8/1978 | Stevens | 204/157.1 R |
| 4,193,855 | 3/1980 | Tuccio | 204/158 R |
| 4,202,741 | 5/1980 | Hartford, Jr. et al. | 204/158 R |

OTHER PUBLICATIONS

Cohen et al., "Reaction of NO(A$^2\Sigma$+) with Carbon Dioxide", *J. Phys. Chem.* 71 (3) 558-63 (Feb. '67).
Lin, "A New Laser Photochemical Process for Isotope Enrichment", *Spec. Lett.* 8 (11) pp. 901-913 (1975).
Letokhov, "Photophysics and Photochemistry", *Phys. Today*, May 1977, pp. 23-32.
Basov et al., "Isotope Separation in Laser-Stimulated Chem. Reactions", *JETP Lett.* 20 (9) pp. 277-278 (1974).

*Primary Examiner*—Deborah L. Kyle
*Attorney, Agent, or Firm*—Robert F. Beers; William T. Ellis

[57] ABSTRACT

A method of separating and concentrating the $^{15}$N isotope from natural abundance nitric oxide (NO) comprising mixing natural abundance nitric oxide in an appropriate mole ratio with carbon dioxide ($CO_2$); irradiating the NO—$CO_2$ mixture with coherent laser light of a desired wavelength, thereby selectively exciting the nitric oxide species containing the $^{15}$N isotope, which subsequently reacts with the carbon dioxide to form nitrogen dioxide ($^{15}NO_2$); and separating said nitrogen dioxide ($^{15}NO_2$) from the gas mixture.

6 Claims, 3 Drawing Figures

BLOCK DIAGRAM TO SEPARATE $^{15}N$ ISOTOPES BASED ON INTRACAVITY ABSORPTION TECHNIQUE

BLOCK DIAGRAM OF APPARATUS TO SEPARATE $^{15}N$ ISOTOPES BASED ON RAMAN SHIFT TECHNIQUE

METHOD OF SEPARATING $^{15}$N FROM NATURAL ABUNDANCE NO

BACKGROUND OF THE INVENTION

This invention relates to a process of isotope separation and more particularly to a process in which $^{15}$N isotopes are selectively extracted from natural abundance nitric oxide (NO).

At present $^{15}$N isotopes, available from commercial suppliers, are prepared by a distillation process from the nuclear generation of daughter product in fission reactions. A mole of $^{15}$NO at 99.5% purity made using this technique costs about $15,000, and is not likely to become available at either a significantly lower price or in a significantly greater amount in the foreseeable future. As there is a continuing demand for the $^{15}$N isotope, as well as other light isotopes, particularly in the nuclear-power industry, there is considerable impetus for finding a much larger, more economical process for producing them.

A technique of $^{15}$N or any other light-isotope preparation should be based on a separation of the desired species from the element found in its natural abundance. Otherwise, both the volume to be produced and the subsequent cost will be inadequate for commercial purposes. $^{15}$N isotopes comprise 0.37% of natural abundance nitrogen, and hence should be capable of separation in single-stage processes which display a single-step enrichment factor of several hundred.

The discovery of the laser with its many diverse photochemical applications has offered great new possibilities to photochemists. Recently developed excimer lasers have effectively opened up new regions of the spectrum to photochemists, since they operate in the ultraviolet and vacuum ultraviolet. These lasers are 1%-3% efficient (based upon wall plug energy) and have a narrow (10Å) free-oscillating bandwidth. In addition, the excimer lasers may be frequency-tuned with intracavity dispersive elements to obtain very narrow linewidth with high peak powers ($\geq$ 1Mwatt).

It has been known for many years that NO absorbs radiation in the 1600–2300Å region is strong discrete absorptions corresponding to several low-lying electronic transitions. Photochemical measurements have shown that NO excited to the A ($^2\Sigma$+) or B ($^2\pi$) states will undergo bimolecular reactions with other species, such as ground state NO, $CO_2$ and many other hydrocarbons.

However, several problems confront the photochemist in designing an effective process for an isotopic separation. First, the desired isotopic product molecules, such as $^{15}$NO, must be capable of a selective excitation in a natural abundance mixture with other isotopic molecules, such as $^{14}$NO. The desired molecules, after being selectively electronically excited, must react in a bimolecular process which yields stable reaction products. Also, unwanted side reactions, such as $^{15}$NO+NO, in the case of NO, and other radical chain reactions which scramble the selectivity, must be supressed. The desired products of the reaction have to be efficiently removed from the reaction zone without undergoing secondary reactions, and finally, the entire process must be cost effective so as to compete with currently used techniques.

SUMMARY OF THE INVENTION

This invention relates to a method for separating $^{15}$N from natural abundance NO and comprises mixing natural abundance NO with an excess amount of $CO_2$, irradiating the NO-$CO_2$ mixture with a coherent laser light so as to selectively excite the NO species containing the $^{15}$N isotope, subsequently reacting these activated $^{15}$N molecules with $CO_2$ to form $^{15}$NO$_2$, and separating $^{15}$NO$_2$ from the gas mixture.

OBJECTS OF THE INVENTION

It is, therefore, an object of this invention to economically separate $^{15}$N from natural abundance NO.

Another object of this invention is to separate $^{15}$N from natural abundance NO in high yields.

Other objects, advantages and novel features of the invention will become apparent from the following detailed description of the invention when considered in conjunction with the accompanying drawings wherein:

FIG. 1 discloses a portion of the spectra of $^{15}$NO (top) and natural abundance nitric oxide (0.37% $^{15}$NO) superimposed over each other.

DESCRIPTION OF THE PREFERRED EMBODIMENT

Figure 1:
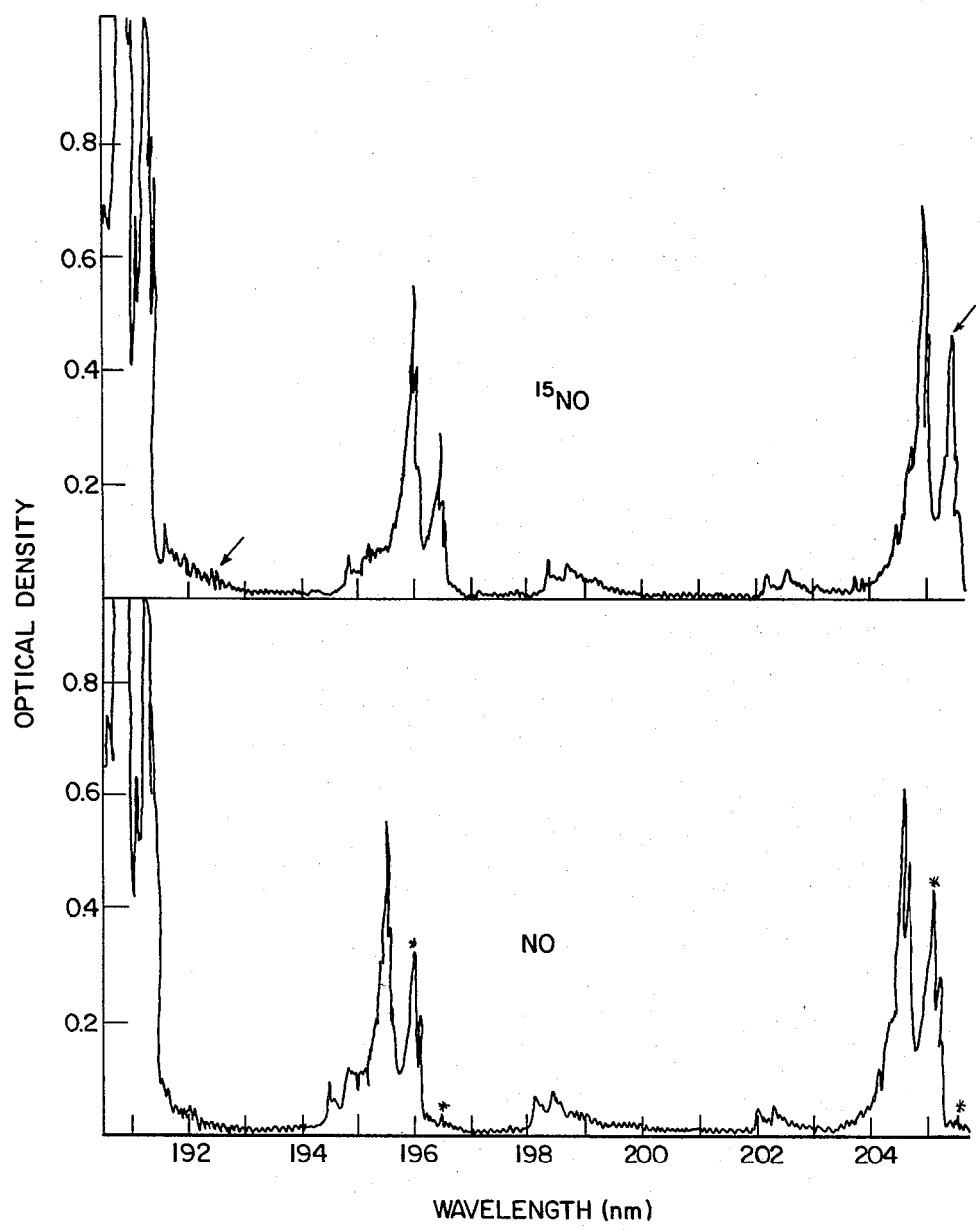

Referring to FIG. 1, the absorption spectra of $^{15}$NO (upper half) and natural abundance NO (lower half) in the 1920–2060Å region is illustrated, as recorded on a Cary Model 118 spectrometer. In the A $^2\Sigma$+→X $^2\pi$ and B $^2\pi$→X $^2\pi$ transitions of NO in this spectral region, the isotope shifts are known to be quite large, approximately 100 cm$^{-1}$, with the $^{15}$NO absorption falling to the long wavelength side of the $^{14}$NO absorption. These excitations are indicated in FIG. 1, where arrows point out the narrow wavebands where these electronic transitions occur for $^{15}$NO, and the asterisks indicate where photoelectric absorptions by $^{15}$NO in natural abundance NO occur. This spectrum clearly indicates that $^{15}$NO in the presence of $^{14}$NO can be excited by a definite choice of laser frequency.

Figure 2:
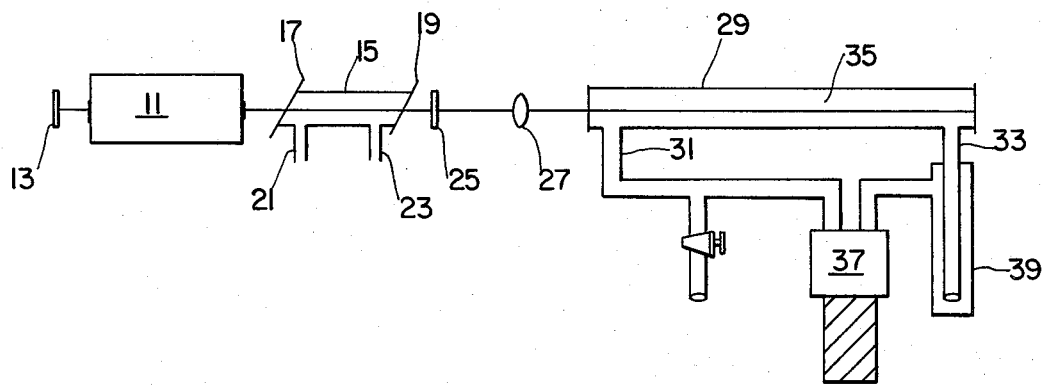
FIG. 2 is a schematic diagram of the apparatus used in the intracavity absorption of NO.

Referring now to FIG. 2, a schematic diagram of apparatus used for one preferred method of isotopic selection is seen. Laser cell 11, preferably an excimer ArF laser cell, has attached to it a laser back mirror 13 for reflection of the light emitted by laser 11. The laser is tuned to emit light in wavelength range of 1927–1942Å, and this light passes into an intracavity cell 15. Intracavity cell 15 is equipped with Brewster angle windows 17 and 19 at the entrance and exit from the cell 15 and side arms 21 and 23 permit the entrance and exit of natural abundance NO containing 0.37% $^{15}$NO. Cell 15 filled with natural abundance NO will spoil the laser pulses preferentially on spectral lines absorbed by $^{14}$NO, to the degree that light emitted by the laser at wavelengths absorbed by $^{14}$NO is reduced in relation to the wavelengths absorbed by $^{15}$NO in approximately the ratio at which they are found in the gas, i.e., 0.9963/0.0037, or about 269 to 1. The net effect of an intracavity cell is to act as a filter, allowing only the wavelengths which activate $^{15}$NO or whatever isotope is desired to pass. Light emitted from cell 15 passes through laser-output coupler 25 and a high-grade UV lens 27 before entering reaction cell 29. Cell 29, which can be any suitable thin tubular reaction vessel, has entrance and exit ports 31 and 33 leading to and from reaction chamber 35. The cell 29 is filled with natural abundance NO and an excess of $CO_2$, at a preferred mole ratio of 100 $CO_2$:1 NO. The primary reaction and the desired reaction, which occurs, is: $^{15}NO^* + CO_2 \rightarrow {}^{15}NO_2 + CO$, where $^{15}NO^*$ represents $^{15}NO$ in the A ($^2\Sigma + v' = 3$) state and $^{15}NO$ in the B ($^2\pi v' \leq 6$) state. These states are electronically stable, and in the absence of collisions radiate to ground state NO by emission of a photon. The proposed reaction is bimolecular and apparently proceeds without the generation of radical species. The rate of reaction of $NO^* + CO$ is known to be 3.4 times faster than the competing rate, $NO^* + NO$. Therefore, by overpressuring the reaction mixture with an excess of $CO_2$ the unwanted side reaction can be suppressed to the extent that it cannot compete with the primary reaction.

Other than the molecular reaction mentioned above of $NO^* + NO$ to generate products, the only other isotopically scrambling reactions likely to take place in the proposed reaction mixture are of an energy transfer type shown below:

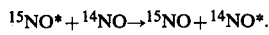

$$^{15}NO^* + {}^{14}NO \rightarrow {}^{15}NO + {}^{14}NO^*.$$

These rates are known and the cross sections for transfer are fairly small (i.e., the maximum cross section is 4.6$A^2$ for transfer of $^{14}NO$ A ($^2\Sigma + v' = 3$) + $^{15}NO$ ($X^2\pi v'' = 0$) $\rightarrow$ $^{14}NO$ X ($^2\pi v' = 0$) + $^{15}NO$ A ($^2\Sigma + v'' = 3$). The energy difference for the reaction is $+128$ cm$^{-1}$; so, the reverse reaction $\Delta E = -128$ cm$^{-1}$ would be comparable and smaller, based upon microscopic reversibility. Therefore, the energy-transfer competitive reactions are of only minor importance and can be suppressed again by over-pressuring with $CO_2$.

The $NO_2$ reaction product will absorb primary photolysis wavelengths; so, it must be promptly removed from the reaction gas mixture between pulses of the laser. A mechanism for accomplishing such a result is schematically diagrammed in FIG. 2, where a closed loop recycling system is shown attached to reaction cell 29.

The reaction cell is swept clean of $NO_2$ by pump 37, operating preferably at a rate of about 1 liter/sec between photolysis laser shots. The gases exit chamber 35 through exit port 33, after which the $NO_2$, primarily $^{15}NO_2$, is scrubbed from the reaction gases by cold trap scrubber 39, operating at about $-65°$ C., while the remainder of the gases are recycled back into the reaction cell entering through port 31. Many other suitable reactor chambers and cold trap scrubbers can be adapted for use in the above system, of course.

Figure 3:
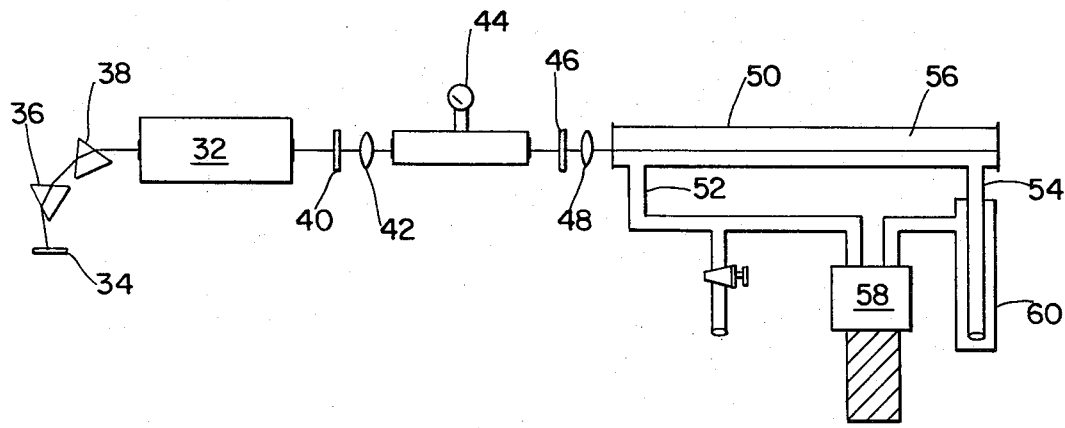
FIG. 3 is a diagram of apparatus used to separate $^{15}$N isotopes based on the Raman shifting technique.

In FIG. 3, a modification of the separation process is shown. The ArF laser is first tuned to the frequency at which the greatest difference in absorptivity between $^{14}NO$ and $^{15}NO$ occurs.

For $^{15}NO$, laser 32 is tuned with dispersive element to oscillate at 1936Å. Light from the laser cavity 32 is reflected back off the laser back mirror 34 through high quality Brewster angle prisms 36 and 38, and continues through laser cavity 32, laser output coupler 40, and high-grade UV lens 42. The coherent light next impinges upon a high pressure deuterium cell 44. The light exiting from this cell undergoes the well-known stimulated Raman shift, which can be as efficient as 50%, to 2055Å. The ratio of absorption coefficients for $^{15}NO$ vs. $^{14}NO$ at 2055Å is about 95 to 1, which is the optimum achievable ratio. The light continues on the same path as in FIG. 2 through filter 46 and lens 48 into reaction vessel 50, which utilizes the same cold trap scrubber as earlier described. Utilizing such a setup for preparation of coherent laser light excitation of naturally abundant NO creates a $^{15}NO_2$ yield greater than 99%.

The above process provides a completely new departure from currently used techniques for $^{15}N$ separation. This technique relies only on natural abundance $^{15}NO$ which is available in unlimited supply and is inexpensive. The amount of $^{15}N$ required in the future will not be dependent solely upon its production by fission reactions.

Excimer lasers, and the ArF laser in particular, are currently in a rapid state of development and engineering improvement. Significant advances are immediately pending for improved power output, repetition rate, and efficiency. As currently configured the ArF laser emits approximately $2 \times 10^{-3}$ Einsteins (moles of photons) per hour. Therefore, in an eight hour day, 0.4 grams of $^{15}NO$ may be processed. Including wall plug cost, supervision, laser cost and maintenance, costs of gases and supplies, physical plant and all indirect costs with present technology, ArF laser prepared isotopes cost about $135/mole. These may drop nearly a factor of ten in the near future due to improved laser capabilities. Based upon the current estimate of $135/mole for photolysis separation, the proposed isotope separation scheme represents a cost savings factor of greater than 100 times over the current retail cost of 99.5% isotopically pure $^{15}N$ in the form of NO.

This technique or slight variations thereof can be used to produce light isotopes which display an absorption spectra similar to NO, that is, a gas which absorbs radiation where no underlying continuous absorption interferes with these sharp transitions. Any gas which meets these criteria, as well as the other variables outlined earlier, is amenable to such an isotopic selection process.

Obviously many modifications and variations of the present invention are possible in light of the above teachings. It is therefore to be understood that within the scope of the appended claims the invention may be practiced otherwise than as specifically described.

We claim:

1. A method for separating $^{15}N$ isotope from natural abundance nitric oxide which comprises admixing natural abundance nitric oxide with an amount of carbon dioxide in excess of stoichiometry to form a gas mixture;

irradiating said gas mixture with radiation at a wavelength in the 1920–2060 Å region which is preferentially absorbed by $^{15}NO$, thereby causing $^{15}NO$ to preferentially react with carbon dioxide to form $^{15}NO_2$; and isolating $^{15}NO_2$.

2. The method of claim 1 wherein said radiation has a wavelength of about 1960 Å.

3. The method of claim 1 wherein said radiation has a wavelength of about 1964–5 Å.

4. The method of claim 1 wherein said radiation has a wavelength of about 2050 Å.

5. The method of claim 1 wherein said radiation has a wavelength of about 2034–5 Å.

6. The methods of claim 2, 3, 4, or 5 wherein natural abundance nitric oxide and carbon dioxide are mixed in a NO:$CO_2$ mole ratio of about 1:100.

* * * * *